US005596308A

United States Patent [19]

Bock

[11] Patent Number: 5,596,308

[45] Date of Patent: Jan. 21, 1997

[54] OVERVOLTAGE SURGE ARRESTER WITH QUICK-ACTING PRESSURE RELIEF MEANS

[75] Inventor: Larry E. Bock, South Glens Falls, N.Y.

[73] Assignee: General Electric Company, New York, N.Y.

[21] Appl. No.: 289,480

[22] Filed: Aug. 11, 1994

[51] Int. Cl.[6] .............................. H01C 7/10; H02H 9/04

[52] U.S. Cl. .............................. 338/20; 338/21; 361/127

[58] Field of Search .............................. 338/13, 20, 21, 338/52, 50, 53, 51, 54, 57; 361/127, 117, 126, 128

[56] References Cited

U.S. PATENT DOCUMENTS

| | | | |
|---|---|---|---|
| 4,001,651 | 1/1977 | Kershaw | 317/61 |
| 4,100,588 | 7/1978 | Kresge | 361/127 |
| 4,910,632 | 3/1990 | Shiga et al. | 361/127 |
| 5,402,100 | 3/1995 | Urbanek et al. | 338/21 |

*Primary Examiner*—Tu Hoang
*Attorney, Agent, or Firm*—William Freedman; Richard A. Menelly; Carl B. Horton

[57] ABSTRACT

A surge arrester having a cylindrical housing with a through-bore, a metal terminal at each end of the housing, varistor elements located within the housing bore, and a vent within at least one terminal for venting arc-generated gases from the interior of the housing in the event of an arc being developed within the bore as a result of failure of a varistor element. The vent can be formed as a passage extending through one of the terminals from the bore to the exterior thereof via a substantially straight-line path that extends longitudinally of the bore. An electrode connected to the other terminal is spaced from the one terminal by a gap located externally of the insulating housing. The gap arcs over in response to receipt of arc-generated gases from the bore. The gap is located at the end of the housing of the one terminal.

11 Claims, 6 Drawing Sheets

OVERVOLTAGE SURGE ARRESTER WITH QUICK-ACTING PRESSURE RELIEF MEANS

CROSS-REFERENCE TO RELATED APPLICATION

This application is related to application Ser. No. 08/163,273, Urbanek et al, filed Dec. 5, 1993, now U.S. Pat. No. 5,402,100 and assigned to the assignee of the present invention.

FIELD OF THE INVENTION

This invention relates to an overvoltage surge arrester and, more particularly, to the type of overvoltage surge arrester that comprises an insulating housing and one or more stacks of metal-oxide varistor elements within the housing.

BACKGROUND

A surge arrester of the above type is normally capable of passing surge currents without any arcing within the housing of the arrester. Under normal voltage conditions, the metal-oxide varistor elements have a high resistance that essentially blocks current flow therethrough; but should a voltage surge appear across the arrester, the varistor elements will respond to the rising voltage of the surge to switch to a low-resistance state that allows excess current to flow through the varistor elements, thereby limiting the voltage across the arrester and across any protected equipment that is connected in parallel with the arrester. Normally, this current through the arrester will be confined to the solid material of the varistor elements, and no arcing will occur within the arrester. Under unusual conditions, however, there is a possibility that one or more of the varistor elements will fail, and this will result in an electric arc being developed across the failed varistor element and, quickly thereafter, along the length of a varistor stack. Such an arc will rapidly generate extremely hot gases and relatively high pressures within the arrestor housing. To protect the arrester housing against being ruptured by such hot gases, it is conventional to provide for venting of the gases to the exterior of the arrester housing and, in effect, transfer the arc to an exterior location.

In conventional arrester designs, the exterior location to which the arc is transferred is along the length of the insulating housing of the arrester and between metal terminals located at opposite ends of the arrester housing. Arc transfer into such an exterior location requires venting of the arc-generated gases through relatively long and constricted passages that redirect the gases from each of the terminals to the opposite terminal. The use of such long, constricted passages for venting is disadvantageous because it lengthens the time required for arc transfer to the exterior and, moreover, requires a complex configuration of vent passages. The lengthened time for arc transfer to the exterior is disadvantageous because it increases the time that the arc remains within the housing interior and subjects the housing to rising and potentially-damaging pressures and temperatures. It is especially important to limit the time required for the arc to transfer to the exterior of the housing in applications involving very high fault currents, such as in applications where the arrester is relied upon to protect series capacitors in a series capacitor compensation scheme.

OBJECTS

An object of my invention is to decrease the time required for the arc resulting from a varistor element failure to transfer from the interior to the exterior of the arrester housing as compared to the time required in the above-described conventional design.

Another object is to provide a pressure-relief system that is capable of effecting a rapid transfer of the arc from the interior to the exterior of the arrester housing without requiring venting passages of relatively long and constricted form.

Still another object is to provide a pressure-relief system capable of effecting the desired rapid arc transfer by employing one or more essentially straight-line passages from the interior to the exterior of arrester housing for venting the arc-generated gases developed within the arrester housing.

Still another object is to transfer the arc to an exterior location where there is less likelihood that the transferred arc will contact and damage the arrester housing as compared to this likelihood in a conventional design where the arc is transferred to a location alongside the housing.

SUMMARY

In carrying out my invention in one form, I provide a surge arrester comprising a tubular housing of insulating material having a bore, a pair of metal terminals at opposite ends of the housing, and a stack of metal-oxide varistor disks located within the housing bore and electrically connected in series with each other between the terminals. The arrester further comprises venting means within the terminals for venting arc-generated gases from the interior of the housing in the event of an electric arc being developed within the housing bore as a result of failure of a varistor disk. This venting means comprises a passage extending through one of the terminals from said bore to the exterior of said one terminal via a substantially straight-line path that extends longitudinally of said bore. An electrode electrically connected to the other terminal is spaced from said one terminal by a gap located externally of the insulating housing. This gap arcs over in response to the receipt by the gap of arc-generated ionized gases from said bore, thereby effectively transferring the arc from the interior to the exterior of the housing. This gap is located at the opposite end of the insulating housing from the location of said other terminal and in a location to receive arc-generated gases expelled through said passage from said bore.

BRIEF DESCRIPTION OF DRAWINGS

For a better understanding of the invention, reference may be had to the following detailed description taken in connection with the accompanying drawings, wherein.

DETAILED DESCRIPTION OF EMBODIMENT

Figure 1:
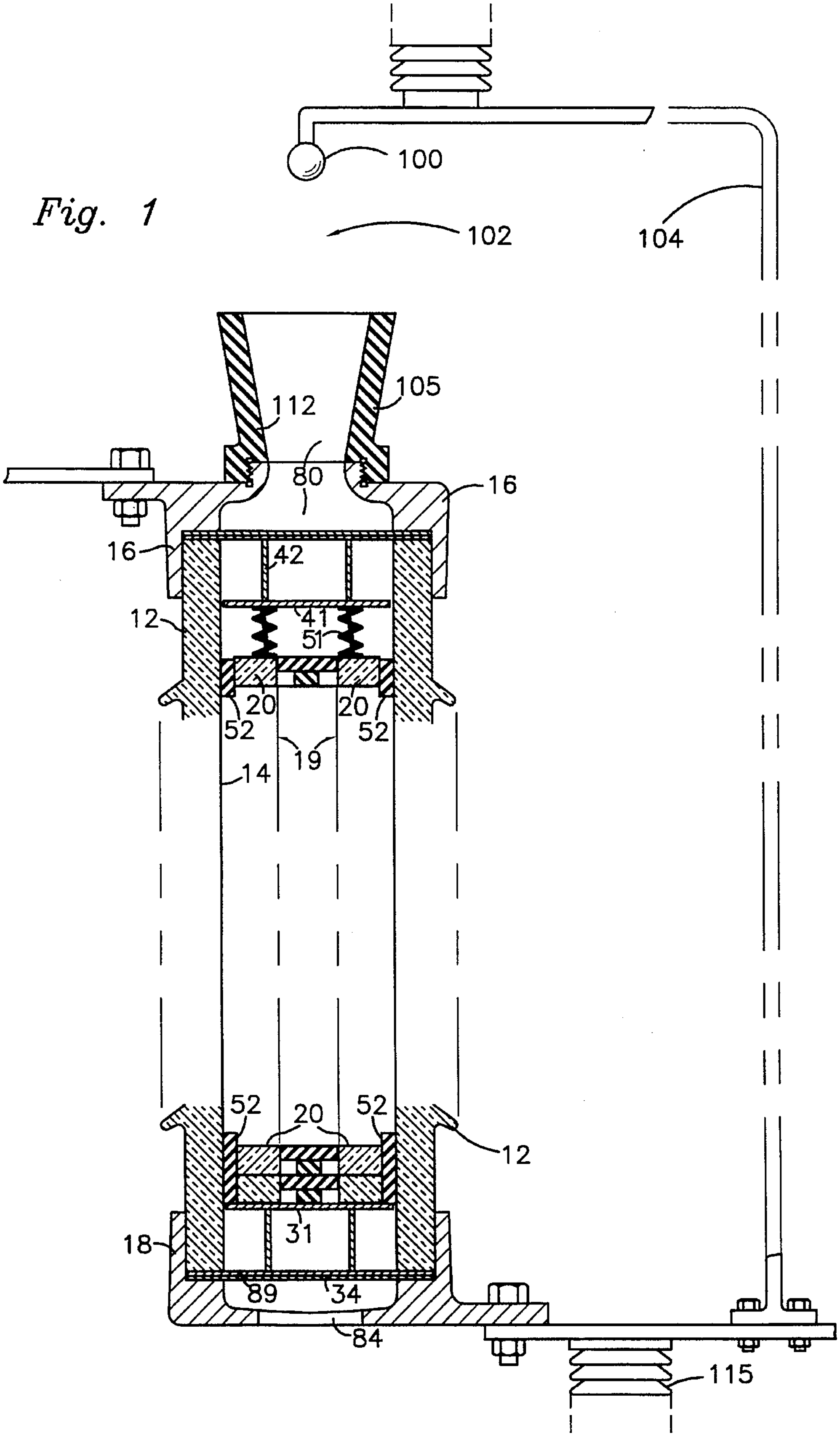
FIG. 1 is a side elevational view, partially in section, showing a surge arrester embodying one form of the invention.
Figure 2:
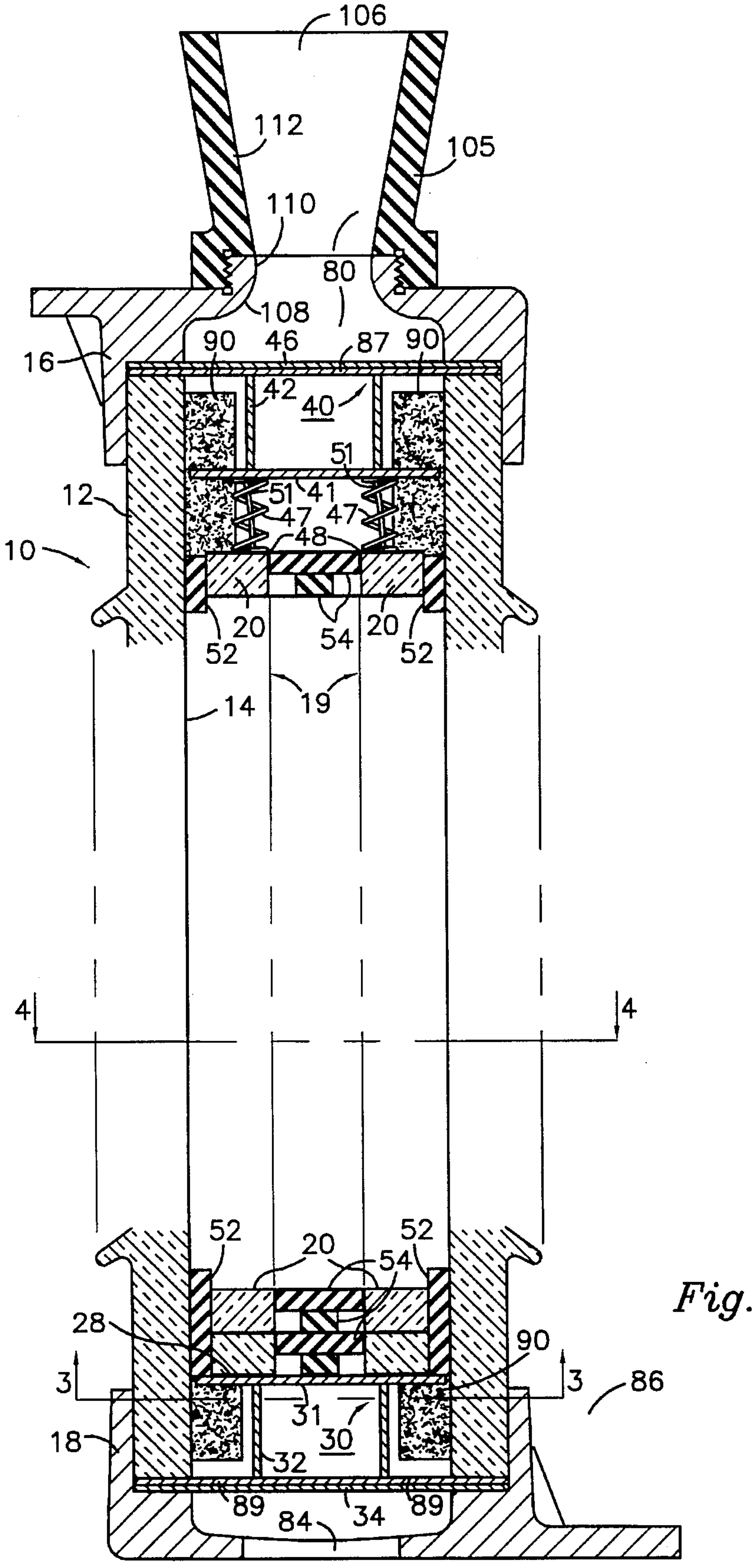
FIG. 2 is an enlarged side elevational view of a major component of the surge arrester of FIG. 1.
Figure 3:
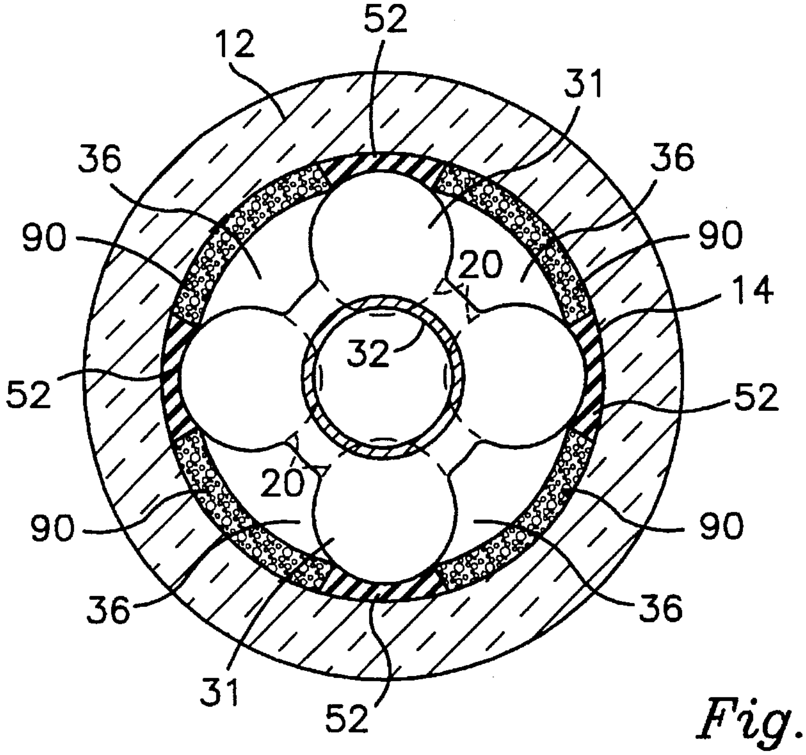
FIG. 3 is a sectional view along the line 3—3 of FIG. 2.

Referring now to FIGS. 1 and 2, the illustrated overvoltage surge arrester 10 comprises a cylindrical porcelain housing 12 having a bore 14 extending between the upper and lower ends of the housing. Fixedly mounted on the upper end of the housing 12 is a first metal end cap 16 serving as one terminal of the arrester, and fixedly mounted on the lower end of the housing is a second metal cap 18 serving as the opposite terminal of the arrester. Electrically connected between the two terminals 16 and 18 are four stacks 19 of varistor elements 20, the stacks being located within the bore 14 of the housing and angularly spaced thereabout by equal distances, e.g., as shown in FIG. 3.

The arrester structure within the housing 12 is basically the same as that disclosed in the aforementioned U.S. Pat No. 5,403,100 and will be described in the present application only insofar as considered necessary to provide an understanding of the present invention. For more details, reference may be had to the aforementioned U.S. Pat. No. 5,403,100 incorporated by reference herein.

Figure 5:
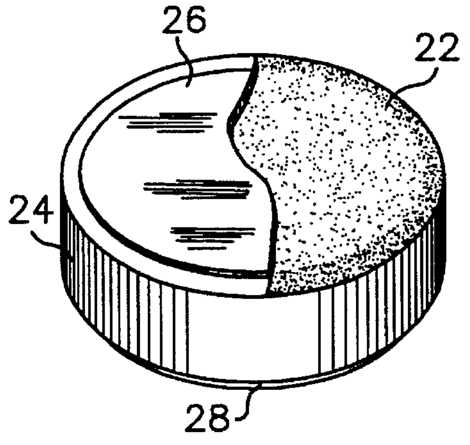
FIG. 5 is an enlarged perspective view of one of the metal-oxide varistor elements present in the arrester of FIGS. 1–4.

Each varistor element 20 is of the conventional construction, for example, depicted in FIG. 5 and comprising a circular disk 22 of sintered metal-oxide material, a thin glass or ceramic collar 24 bonded to the circular outer periphery of the disk 22, and flat metal electrodes 26 and 28 bonded to the upper and lower faces of disk 22. Each disk 22 is of conventional metal-oxide varistor formulation, preferably one containing as its principal constituent zinc oxide, and the electrodes 26 and 28 are of a good conductive material, preferably arc or flame-sprayed aluminum. The electrodes are free to make good contact with the juxtaposed electrodes of adjacent varistor elements when the varistor elements are stacked and pressed axially together in the assembled arrester.

The varistor elements in each stack 19 are electrically connected in series between the terminals 16 and 18 of the arrester, and the stacks are electrically connected in parallel between these terminals At the lower end of the arrester, the stacks 19 are electrically connected to the lower terminal 18 by a conductive support plate assembly 30 comprising an upper horizontally-disposed flat metal plate 31 and a metal cylinder 32 welded at its upper end to the plate 31 and at its lower end to a metal cutter plate 34. Cutter plate 34 is in good electrical contact with the lower end cap 18. The varistor stacks 19 are seated upon the upper surface of plate 31, with the lower electrode 28 of each stack in contact with this upper surface. Referring to FIG. 3, the plate 31 has four U-shaped cut-out regions 36 that provide large openings through the plate through which arc-generated gases can flow should an arc develop within the arrester housing, as will soon be described.

At the upper end of the arrester, there is a similar conductive plate assembly 40 making good electrical contact with the upper terminal 16 of the arrester. This upper conductive plate assembly comprises an upper cutter plate 46 that contacts the upper terminal 16 and a metal cylinder 42 welded at its upper end to plate 46 and at its lower end to a flat horizontally-disposed lower plate 41. Between this lower plate 41 and the top of the varistor stacks are four compression springs 47. Each of these compression springs bears at its upper end against plate 41 and at its lower end against one of four contact plates 48 respectively seated atop the varistor stacks 19. These compression springs 47 urge their associated varistor stacks downwardly against the conductive support plate 31 at the bottom end of the arrester, thereby compressing the stacks and maintaining good electrical contact between the adjacent electrodes of the juxtaposed varistor elements in each stack. Suitable conductive and flexible shorting straps (51) electrically connect the contact plates 48 and the lower plate 41 to provide electrical connections around the springs 47 between plates 48 and 41, thereby completing the electrical connection between the upper terminal 16 and the tops of the varistor stacks. The plate 41, like its counterpart 31 at the bottom of the arrester, has four U-shaped cut-out regions therethrough that provide large openings through the plate through which arc-generated gases can flow, should an arc develop within the arrester, as will soon be described.

Because the varistor elements 20 are continuously connected between the terminals 16 and 18 of the arrester, a low but continuous current will flow through the varistor elements, and this current will cause a small amount of power to be dissipated by the varistor elements at normal system voltage and at normal operating temperature. The magnitude of both the current and the resulting power increases as the varistor element temperature increases. To prevent thermal runaway not only under these continuous current conditions but also when high current surges flow through the varistor elements, heat transfer is provided for from the varistors to the porcelain housing. For example, referring to FIGS. 1–4, especially FIG. 3, the heat-transfer can be provided by four strips, or liners, 52 of electrical insulating material having good heat-transfer properties, one strip, or liner, being provided for each varistor stack in a location between the varistor stack and the bore 14 of the porcelain housing. Each of these strips 52 extends partially around the perimeter of its associated varistor stack 19 and also extends along the full length of the stack. In one embodiment of the invention, each strip 52 is of a suitable silicone rubber. The strips 52 are maintained in effective heat-transfer relationship with the bore 14 and the outer periphery of the varistor stacks 19 by a series of resilient spacer wedges 54 stacked along the length of the varistor stacks in a location radially inward of the varistor stacks and exerting radially-outward force on the varistor stacks. This radially-outward force compresses, or sandwiches, the strips 52 between the varistor stacks and the bore 14, maintaining intimate contact and an effective heat-transfer relationship between the strips 52 and the bore 14 and the varistor-stack peripheries.

As will soon be described in more detail, our arrester is especially suited for high-energy circuit applications. One such circuit application is the series-capacitor compensation scheme schematically illustrated in FIG. 6. In this circuit application, a series capacitor bank 60 is connected in series with a high voltage a.c.line 62, and the above-described overvoltage surge arrester (or arresters) 10 is connected in parallel with the series capacitor bank. A high voltage source for supplying the line 62 is schematically shown at 61, and a load connected to the line is schematically shown at 63. The parallel combination of the capacitor bank 60 and the arrester 10 are connected in series with the line 62. In the illustrated embodiment, connected in parallel with the arrester 10 is the series combination of an inductance 65 and a normally-open by-pass switch 66 that is operated to closed position under certain conditions soon to be described. A suitably-controlled circuit breaker 68 connects the source 61 to the power line 62 and can open under predetermined conditions to protect the circuit from certain abnormal currents, all in a conventional manner.

Under normal voltage conditions on the line 62, the varistor elements in the arrester 10 are in a high-resistance state. But should a fault appear on the line, the varistor elements will respond to the rising series capacitor voltage by switching to a low resistance state that allows excess current above the series capacitor rating to pass through the varistor elements while effectively limiting the voltage across them, thereby protecting the series capacitor from the excess voltage and current. Normally, when the fault is cleared, the varistor elements will return to their high-resistance state.

In the illustrated arrester the four parallel connected varistor stacks 19 will normally share the current through the arrester when the arrester operates as above described, and no arc will develop within the interrupter housing. Under unusual circumstances, however, one or more of the varistor elements 20 might fail, and this could lead to an arc developing alongside one of the varistor stacks 19. This arc would quickly lengthen and, in effect, constitute a short circuit path by-passing the varistor stacks and appearing as a short circuit across the capacitor bank 60. This could result in the capacitor bank rapidly discharging through the arrester 10, producing through the arrester a relatively high frequency current with extremely high peak values. A typical such current would have a frequency of 2,000–3,000 Hz and a peak value of 300 to 400 KA.

Figure 6:
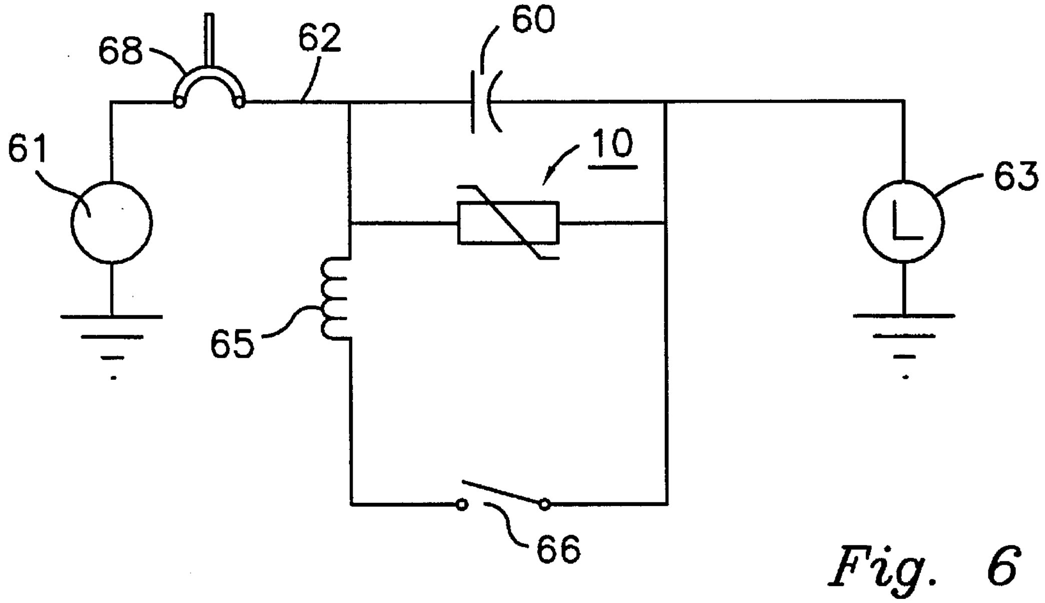
FIG. 6 is simplified circuit diagram showing the arrester of FIGS. 1–4 being used in a series-capacitor compensation scheme.
Figure 7:
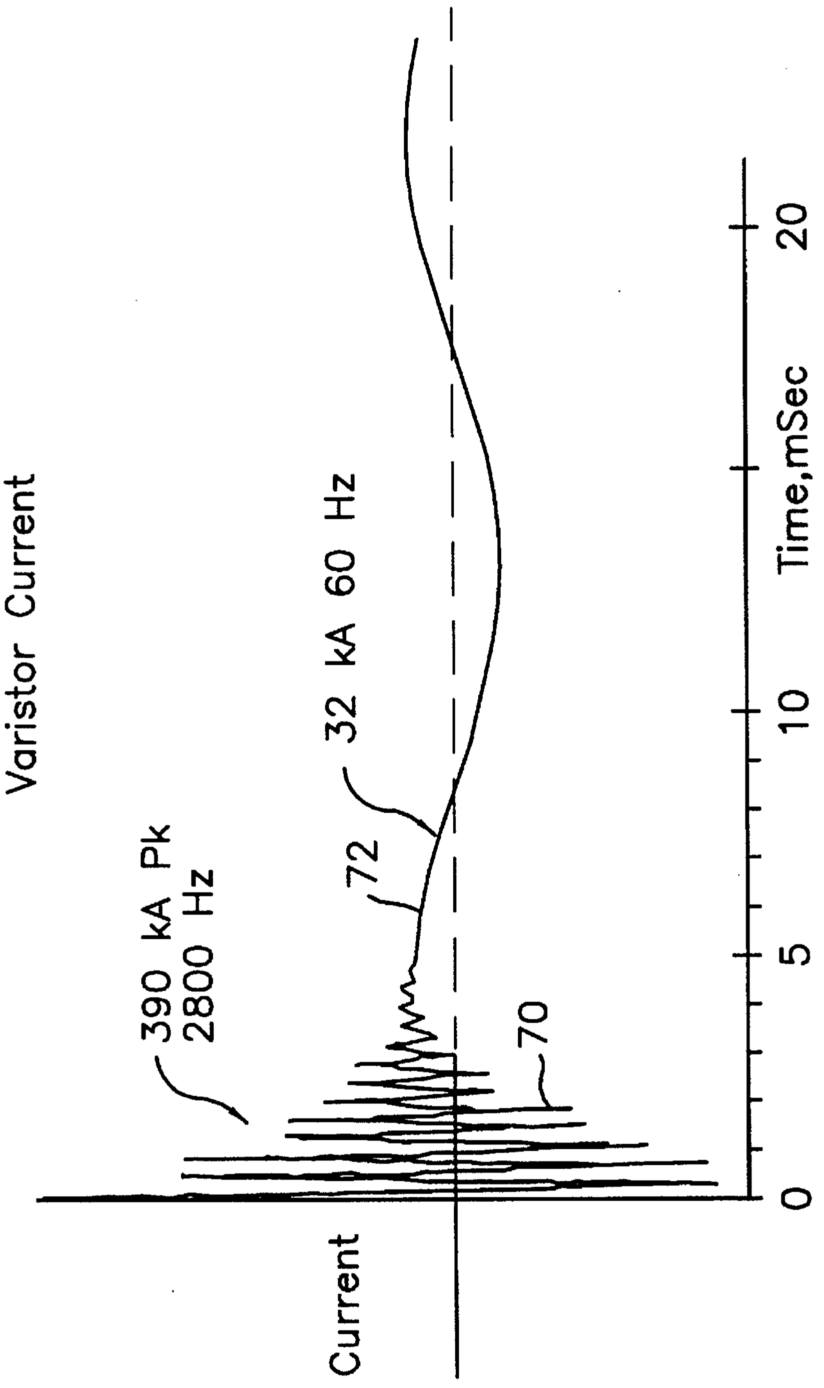
FIG. 7 is a graph illustrating certain current conditions that can possibly occur in the event that a varistor element within the arrester should fail when the arrester is being used in the series-capacitor compensation scheme of FIG. 6.

Under most circumstances, this capacitor discharge current is accompanied by a high power-frequency fault current through the arrester from the source 61 of the power line 62. This power-frequency current might typically be 30 to 40 KA RMS in amplitude and 60 Hz in frequency. This current condition is represented in the graph of FIG. 6, where the capacitor discharge current is depicted at 70 and the current from the line 62 is depicted at 72. It will be apparent that this combination of high currents flowing through an arc in the arrester imposes upon the arrester an extremely high energy burden that is characterized by an extremely high rate of energy input.

To protect the porcelain housing 12 of the arrester from rupturing under these high-energy arcing conditions, the end caps 16 and 18 of the arrester are provided with a vent for rapidly venting from the housing interior the hot gases developed by the high-current arc within the housing. Referring to FIG. 2, the vent in the upper end cap 16 can be formed as an exhaust passage 80 substantially aligned with the bore 14 of the housing 12 and extending longitudinally of the bore from the interior of end cap 16 to the exterior space above the end cap via a substantially straight-line path. The vent in the lower end cap 18 can be formed similarly as an exhaust passage 84 also substantially aligned with the bore 14 of the housing 12 and extending longitudinally of the bore via a substantially straight-line path.

Figure 4:
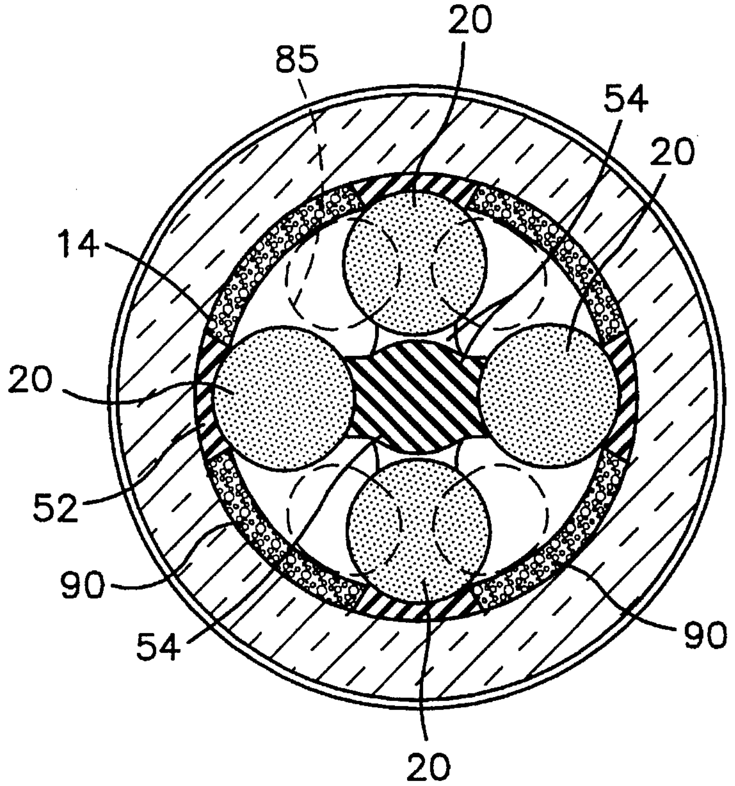
FIG. 4 is a sectional view along the line 4—4 of FIG. 2.

The upper exhaust passage 80 is normally isolated from the interior of the housing 12 by a diaphragm 87 that provides a seal between the interior and the exhaust passage 80; and the lower exhaust passage 84 is normally isolated from the interior of the housing 12 by a corresponding diaphragm 89 that provides a seal between the interior and the lower exhaust passage 84. The two diaphragms 87 and 89 are preferably of metal, and each is backed-up by a cutter plate having large sharp-edge holes in it. The upper cutter plate is shown at 46 and the lower one at 34. When an arc-produced high pressure suddenly develops within the interior of the arrester, the diaphragms 87 and 89 are abruptly forced outwardly against their associated cutter plates and are cut at the sharp edges of the holes in the cutter plates, the pressure acting to expel the cut-out portions of the diaphragms through the holes in the cutter plates, all in a conventional manner. FIG. 4 shows in dotted lines 85 the location of the holes in the lower cutter plate. When the diaphragms are thus ruptured, the pressurized gas within the interior of the housing 12 is free to discharge through the exhaust passages 80 and 84.

The hot ionized gases issuing from the upper exhaust passage 80 are directed into a gap 102 that is present between the upper terminal 16 and an electrode 100 spaced from the upper terminal. This gap has the same voltage across it as is present between the two terminals 16 and 18 of the arrester and normally has a high dielectric strength that renders it non-conducting. But the hot ionized gases directed into it quickly reduce its dielectric strength and cause it to break down, thereby developing an arc across the gap, thus shorting out the arc within the arrester housing. In effect, the arc that had been inside the arrester housing 12 is transferred to a location outside the housing.

The electrode 100 is at the same potential as the bottom terminal 18 of the arrester, being connected to the bottom terminal by a conductor schematically shown at 104. In the illustrated embodiment, the electrode 100 is located in substantial alignment with the exhaust passage 80 so that the gap 102 directly receives the hot ionized gases issuing from the exhaust passage 80. These gases are not required to travel through a relatively long and constricted passage (as typified by passages 80 and 84 in the aforementioned U.S. Pat. No. 5,402,100 before entering the gap, thus reducing the cooling and time delay effects resulting from travel through such a passage. This is advantageous since it is highly desirable to effect arc-transfer to the external gap as rapidly as possible in order to limit the quantity of gases and the resulting temperatures and pressures developed within the interior of housing 12.

To accelerate the flow of the hot gases from the upper arrester terminal 16 to the region immediately adjacent the electrode 100, a nozzle 105 is provided as part of the upper terminal. This nozzle has a flow passage 106 directed toward the electrode 100 from the bore 14 of the arrester housing 12. This flow passage 106 forms a part of the upper exhaust passage 80. The nozzle contains an entry section 108, a throat 110, and an exhaust section 112 upstream from the throat 110. The nozzle flow passage is shaped so that supersonic flow occurs in the exhaust section, thus accelerating the flow of the hot ionized gases across the gap 102 and into the immediate region of the electrode 100, thus accelerating arc-over of the gap 102 following the initiation of an arc within the arrester housing 12.

The nozzle 105 can be formed from a suitable metal. However, if lightning strike is a concern, to avoid compromising the dielectric strength of the gap 102 when gap arc-over is not desired, the nozzle can be made from an electrical insulating material such as polymer concrete, or a ceramic material such as alumina. Preferably, the entry section 108 of the nozzle is made of metal to provide a foot point for the lower arc terminal when the gap 102 arcs over.

The arc in the external gap 102 can be extinguished by closing the by-pass switch 66 (FIG. 6) that is connected in parallel with the surge arrester 10. Closing of the bypass switch 66 is effected immediately after gap 102 arcs over. Current through the by-pass switch 66 is interrupted by opening of the circuit breaker 68 (FIG. 6).

In the surge arrester of the aforementioned U.S. Pat. No. 5,402,100 the external gap is located physically between the arrester terminals 16 and 18 and alongside the housing 12. I am able to change the location of this external gap to that illustrated in FIG. 1 by including the auxiliary electrode (100) and the illustrated connection 104 between the auxiliary electrode and the bottom terminal 18.

It is to be noted that the bottom exhaust passage 84 can also be of a relatively short and unconstricted form since the gases issuing therefrom are not needed to initiate an external arc. This being the case, there is no need to direct these gases transversely of the housing and then upwardly toward the other terminal as in the arrester of the aforementioned U.S. Pat. No. 5,402,100. Accordingly, these gases may be exhausted directly downward from the interior to the exterior of housing 12 via the essentially straight-line passage 84. Exhausting a substantial portion of the arc-generated gases via such a low-impedance path materially assists in reducing the rate and magnitude of the pressure build-up within the porcelain housing 12. A supporting insulator 115 beneath the arrester elevates the passage 84 from any structure beneath the arrester to provide ample clearance space for gases to discharge freely in a downward direction through exhaust passage 84.

In the illustrated arrester, the diaphragms 87 and 89 serve to provide protective seals for the interior of the arrester that allow the interior to be filled with an appropriate gas filler isolated from the outside ambient. A preferred filler is dry air. The entry of moisture into the space above the diaphragm 87 can be prevented by providing a thin protective membrane (not shown) over the mouth of the nozzle. The membrane can be formed from conventional membrane materials such as lead, aluminum, or tin. This membrane is quickly ruptured and blown away by the hot gases discharged through the exhaust passage 80 when an arc is developed within the arrester housing 12.

In the illustrated embodiment of the invention, additional rupture-protection for the housing 12 is provided by including within the housing four liners in the form of blankets 90, each made of matted-together alumina fibers, and each extending along the length of the porcelain housing 12 in positions angularly between the heat transfer strips 52 of the four varistor stacks 19. These blankets 90 are located immediately adjacent the bore 14 and are bonded thereto by a refractory adhesive. These blankets, which are described in more detail in the aforementioned U.S. Pat. No. 5,402,100 protect the porcelain housing from being ruptured by the pressure and temperature shock waves produced by the abruptly-developed arc within the housing 12.

In most surge arrester applications, it is advantageous to dispose the external gap in a location above the arrester housing, as has been done in the illustrated embodiment, where external gap 102 is located above housing 12. Typically, there is less available space beneath than above the arrester housing in which to locate a high voltage electrode, such as 100, which requires its own electrical clearances. The invention in its broader aspects, however, comprehends an arrangement in which the auxiliary gap is located below the arrester housing. In this latter arrangement, the auxiliary electrode 100 would be electrically connected to the upper terminal of the arrester.

Figure 8:
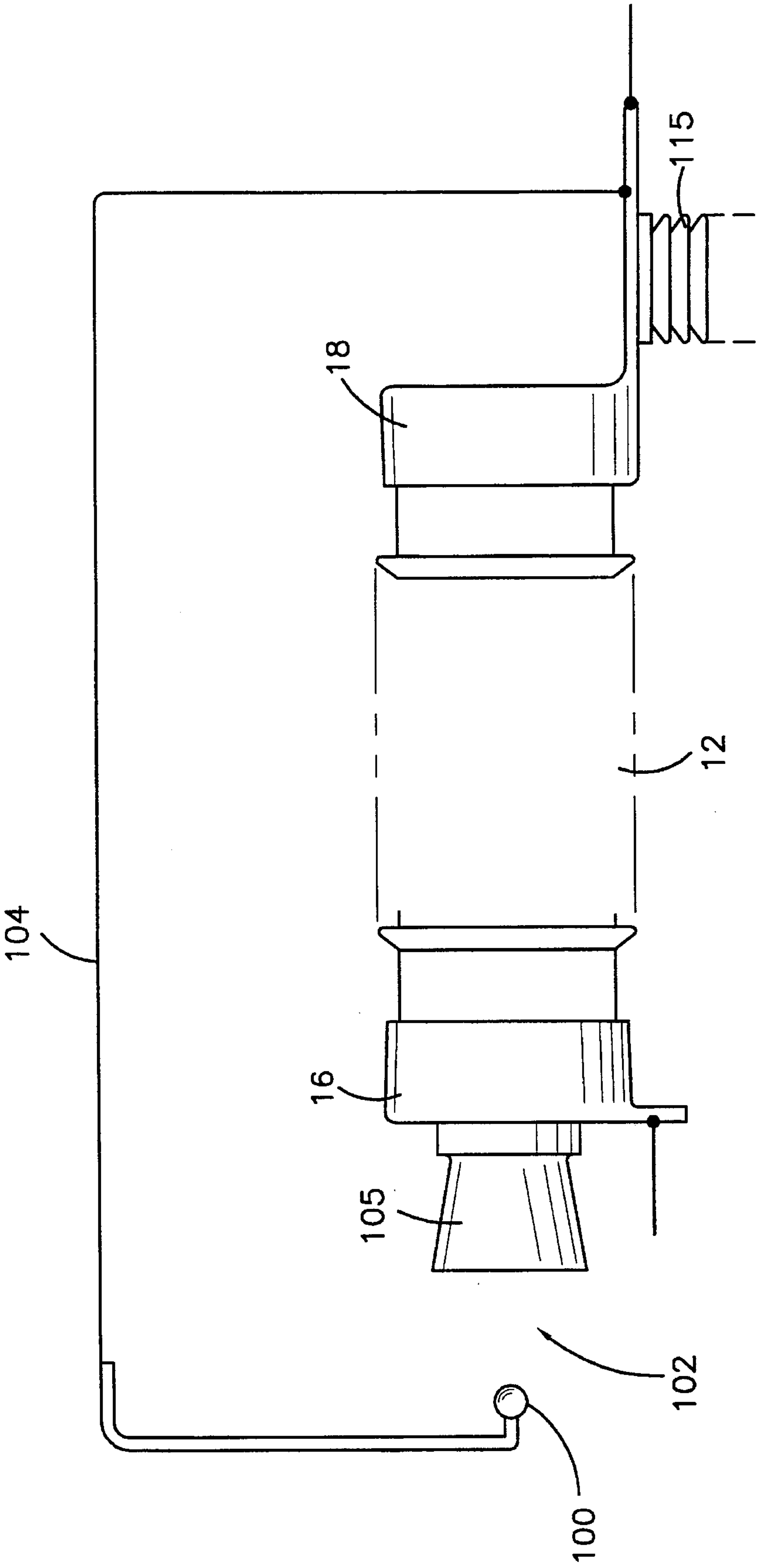
FIG. 8 is a schematic illustration of a modified embodiment.

In still another modified embodiment within the broader aspects of the invention, the arrester housing 12 is disposed with its longitudinal axis disposed horizontally and with the auxiliary electrode (100) horizontally spaced from one terminal of the arrester housing, thereby locating the external gap (102) at one horizontal end of such housing. This embodiment is schematically illustrated in FIG. 8, where parts corresponding to those of the FIG. 1 embodiment are designated with the same reference numerals as in FIG. 1.

While I have described particular embodiments of my invention, it will be obvious to those skilled in the art that various changes and modifications may be made without departing from the invention in its broader aspects; and I, therefore, intend herein to cover all such changes and modifications as fall within the true spirit and scope of my invention.

What I claim is:

1. An arrester comprising:

(a) a cylindrical insulating housing having a bore, (b) a first metal terminal at one end of the housing and a second metal terminal at the other end of the housing, (c) a stack of varistor elements connected in series between said first and second terminals within said bore, (d) said first terminal having a vent extending therethrough for venting an arc generated gas from said bore, and (e) an electrode connected to said second terminal and spaced from said first terminal by a gap located so that an arc forms in the gap when the gas is vented from said bore.

2. The arrester of claim 1 in which the vent comprises a passage extending from said bore through said first terminal to said gap via a substantially straight line path that extends longitudinally of said bore.

3. The arrester of claim 1 in which:

(a) the cylindrical insulating housing is tubular and extends generally vertically, (b) the first terminal is located at a top end of the housing and the second terminal is located at a bottom end of the housing, and (c) the electrode and the gap are located above the housing.

4. The arrester of claim 1 in which the second terminal has a second vent extending therethrough for venting the gas from said bore.

5. The arrester of claim 4 in which the second vent is a second passage extending from said bore to the space exterior thereof via a substantially straight-line path that extends longitudinally of said bore.

6. The arrester of claim 2 in which the second terminal has a second passage extending from said bore to the space exterior thereof via a substantially straight-line path that extends longitudinally of said bore, said passage through the first terminal discharging gases from said bore in an upward direction and said second passage through the second terminal discharging gases from said bore in a downward direction.

7. The arrester of claim 1 in which the bore of said housing extends generally horizontally.

8. The arrester of claim 1 in which the vent is comprised of a nozzle containing a flow passage directed from said housing bore toward the electrode.

9. The arrester of claim 8 in which said nozzle is comprised of a throat and an exhaust section upstream from said throat, said flow passage being shaped to produce supersonic flow of the gas in said exhaust section.

10. The arrester of claim 1 in which:

(a) the housing is tubular and extends generally vertically, (b) a first terminal is located at a top end of the houseing and a second terminal is located at a bottom end of the housing, and (c) the electrode and the gap are located below the housing, with the electrode being eletrically connectedd at the the top end of the housing.

11. The arrester of claim 1 in which;

(a) the housing is tubular and extends generally horizontally, (b) one terminal is located at one end of the housing and the other terminal is located at the other end of the housing, and (c) the electrode and the gap are located at one horizontal end of said housing.

* * * * *